United States Patent
Kochi et al.

(10) Patent No.: US 11,682,255 B2
(45) Date of Patent: Jun. 20, 2023

(54) FACE AUTHENTICATION APPARATUS

(71) Applicant: NEC Corporation, Tokyo (JP)

(72) Inventors: Taketo Kochi, Tokyo (JP); Kenji Saito, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/527,289

(22) Filed: Nov. 16, 2021

(65) Prior Publication Data
US 2022/0076515 A1   Mar. 10, 2022

Related U.S. Application Data

(63) Continuation of application No. 16/961,431, filed as application No. PCT/JP2018/047064 on Dec. 20, 2018, now Pat. No. 11,210,879.

(30) Foreign Application Priority Data

Jan. 12, 2018   (JP) .................................. 2018-003231

(51) Int. Cl.
*G07C 9/37* (2020.01)
*G07C 9/10* (2020.01)
(Continued)

(52) U.S. Cl.
CPC ........... *G07C 9/37* (2020.01); *G06V 10/7515* (2022.01); *G06V 40/166* (2022.01);
(Continued)

(58) Field of Classification Search
CPC .. G07C 9/10; G07C 2209/62; G07C 2209/14; G07C 9/00563; G07C 9/257; G07C 9/37;
(Continued)

(56) References Cited

U.S. PATENT DOCUMENTS

| | | | |
|---|---|---|---|
| 8,089,341 B2 | 1/2012 | Nakagawa | G06Q 10/0633 340/5.7 |
| 8,193,904 B2 | 6/2012 | Kawakita | G07C 9/38 340/5.2 |

(Continued)

FOREIGN PATENT DOCUMENTS

| | | |
|---|---|---|
| EP | 1251468 A2 | 10/2002 |
| JP | H05-163860 A | 6/1993 |

(Continued)

OTHER PUBLICATIONS

International search report for PCT/JP2018/047064 dated Mar. 19, 2019.
(Continued)

*Primary Examiner* — Nam V Nguyen

(57) ABSTRACT

A face authentication apparatus includes a face image acquisition unit that acquires a face image of a user who passes through a first gate provided at a first boundary between zones, a collation unit that performs face authentication on the face image on the basis of a threshold, an operating state acquisition unit that acquires an operating state of a second gate provided at a second boundary that is different from the first boundary, and a threshold change unit that changes the threshold on the basis of the operating state of the second gate.

9 Claims, 12 Drawing Sheets

(51) Int. Cl.
*G06V 40/16* (2022.01)
*G06V 10/75* (2022.01)

(52) U.S. Cl.
CPC .......... *G06V 40/168* (2022.01); *G06V 40/172* (2022.01); *G07C 9/10* (2020.01)

(58) Field of Classification Search
CPC ........... G06K 9/00255; G06K 9/00268; G06K 9/00288; G06T 7/00
USPC ........................... 340/5.53, 5.54, 5.3; 700/12
See application file for complete search history.

(56) References Cited

U.S. PATENT DOCUMENTS

| | | | | |
|---|---|---|---|---|
| 8,299,890 | B2 | 10/2012 | Nagasawa | G06F 1/3203 340/5.2 |
| 8,570,142 | B2 | 10/2013 | Tada | G07C 9/38 340/5.2 |
| 8,639,624 | B2 | 1/2014 | Ono | G06Q 10/10 705/50 |
| 9,189,680 | B2 | 11/2015 | Komatsu | G06K 9/00288 |
| 9,481,197 | B2 | 11/2016 | Eckel | G06K 9/00456 |
| 9,747,494 | B2 * | 8/2017 | Lo | G06V 40/171 |
| 9,973,732 | B1 | 5/2018 | Goetz | H04N 5/23219 |
| 10,127,754 | B2 * | 11/2018 | Child | G07C 9/00563 |
| 10,452,897 | B1 | 10/2019 | Benkreira | G06K 9/00268 |
| 10,911,224 | B1 * | 2/2021 | Marappan | H04W 12/106 |
| 10,956,876 | B2 * | 3/2021 | Dreyer | E05F 15/60 |
| 11,210,879 | B2 * | 12/2021 | Kochi | G06V 10/7515 |
| 2006/0126906 | A1 | 6/2006 | Sato | G07C 9/38 382/118 |
| 2010/0045424 | A1 | 2/2010 | Kawakita | |
| 2017/0140212 | A1 | 5/2017 | Lo | G06K 9/6206 |
| 2017/0142589 | A1 | 5/2017 | Park | H04W 12/086 |
| 2017/0351909 | A1 | 12/2017 | Kaehler | G06K 9/00456 |
| 2018/0068173 | A1 | 3/2018 | Kolleri | G06F 16/29 |
| 2018/0350171 | A1 | 12/2018 | Weston | G06Q 10/02 |
| 2020/0043344 | A1 | 2/2020 | Shimizu | G08G 1/00 |

FOREIGN PATENT DOCUMENTS

| | | |
|---|---|---|
| JP | 2003-206659 A | 7/2003 |
| JP | 2005-242775 A | 9/2005 |
| JP | 2007-156541 A | 6/2007 |
| JP | 2008-27432 A | 2/2008 |
| JP | 2009-3659 A | 1/2009 |
| JP | 2010-3009 A | 1/2010 |
| JP | 2011-6886 A | 1/2011 |
| JP | 2015-176411 A | 10/2015 |
| JP | 2017-215737 A | 12/2017 |
| WO | 2008/066130 A1 | 6/2008 |

OTHER PUBLICATIONS

JPO office action for JP2018-003231 dated Feb. 5, 2019.
JPO decision of refusal for JP2018-003231 dated Apr. 16, 2019.
JPO office action for JP2018-003231 dated Jul. 23, 2019.
JPO decision to grant for JP2018-003231 dated Sep. 24, 2019.
Communication dated Aug. 19, 2020, from the Japanese Patent Office in application No. 2019-111730.
Extended European Search Report for EP Application No. EP18899520.3 dated Jan. 19, 2021.
Japanese Office Action for JP Application No. 2021-167871, dated Nov. 8, 2022 with English Translation.

* cited by examiner

FIG. 2

| GATE | AUTHENTICATION METHOD | INITIAL VALUE OF COLLATION THRESHOLD FOR FACE AUTHENTICATION |
|---|---|---|
| G1,G2 | TWO-FACTOR AUTHENTICATION BY IC CARD AUTHENTICATION AND FACE AUTHENTICATION | SMALL |
| G3,G4 | FACE AUTHENTICATION | MIDDLE |
| G5 | TWO-FACTOR AUTHENTICATION BY PASSWORD AUTHENTICATION AND FACE AUTHENTICATION | SMALL |
| G6~G10 | FACE AUTHENTICATION | SMALL |

PRIORITY 1

If working states of both gate G1 and gate G2 are "released" (condition section), collation threshold for face authentication at gate G3 is set to be "large" (conclusion section).

125-2

PRIORITY 4

If working states of both gate G1 and gate G2 are "working with two-factor authentication" (condition section), collation threshold for face authentication at gate G3 is set to be "middle" (conclusion section).

125-3

PRIORITY 1

If working states of both gate G1 and gate G2 are "working with one-factor authentication" (condition section), collation threshold for face authentication at gate G3 is set to be "large" (conclusion section).

PRIORITY 1

If working state of gate G5 is "working with one-factor authentication" (condition section), collation threshold for face authentication at gate G3 is set to be "large" (conclusion section).

125-6

PRIORITY 4

If working state of gate G5 is "working with two-factor authentication" (condition section), collation threshold for face authentication at gate G3 is set to be "middle" (conclusion section).

125-7

PRIORITY 2

If authentication of a specific person has succeeded at gate G1 or gate G2 (condition section), collation threshold for face authentication at gate G3 is set to be "large" (conclusion section).

125-8

PRIORITY 2

If authentication of a specific person has succeeded at gate G9 or gate G10 (condition section), collation threshold for face authentication at gate G3 is set to be "middle" (conclusion section).

PRIORITY 3

If the number of times of authentication success per unit time at gate G1 and gate G2 is equal to or larger than predetermined value (condition section), collation threshold for face authentication at gate G3 is set to be "small" (conclusion section).

125-10

PRIORITY 3

If the number of times of authentication success per unit time at gate G1 and gate G2 is smaller than predetermined value (condition section), collation threshold for face authentication at gate G3 is set to be "middle" (conclusion section).

125-11

PRIORITY 3

If working state of gate G4 is "closed" (condition section), collation threshold for face authentication at gate G3 is set to be "small" (conclusion section).

125-12

PRIORITY 4

If working state of gate G4 is "working with one-factor authentication" (condition section), collation threshold for face authentication at gate G3 is set to be "middle" (conclusion section).

FACE AUTHENTICATION APPARATUS

CROSS-REFERENCE TO RELATED APPLICATIONS

The present application is a continuation application of U.S. patent application Ser. No. 16/961,431, now U.S. Pat. No. 11,210,879, filed on Jul. 10, 2020, which is a National Stage Entry of international application PCT/JP2018/047064, filed Dec. 20, 2018, which claims the benefit of priority from Japanese Patent Application 2018-003231 filed on Jan. 12, 2018, the disclosures of all of which are incorporated in their entirety by reference herein.

TECHNICAL FIELD

The example embodiments relates to a face authentication apparatus, a face authentication method, and a recording medium.

BACKGROUND ART

Conventionally, in various systems such as an access monitoring system and an attendance management system, personal authentication by means of face authentication is performed on a user who passes through a gate or the like.

For example, Patent Literatures 1 and 2 disclose a face authentication apparatus that acquires a face image of a person who passes through a gate provided at an entrance of a collective housing or an office building, calculates similarity between the face image and a reference face image of a previously registered person, and compares it with a threshold, to thereby perform personal authentication between the face image of the authentication target and the reference face image.

Further, in the face authentication apparatus of this type, a configuration of automatically changing a threshold to be used for collation is employed.

For example, in Patent Literature 1, a threshold to be used for collation of a person who passes through a gate is automatically changed based on a reference time such as an average time to go home of the person who uses the gate and the current time. In Patent Literature 2, the number of persons who pass through a gate is measured, and when the number of persons is large, a threshold used for collation of persons who pass through the gate is set to be small.

Patent Literature 1: JP 2009-3659 A
Patent Literature 2: JP 2007-156541 A

SUMMARY

In relatively large-scale facilities, multilevel security gates may be constructed by partitioning the facilities into a plurality of zones corresponding to a plurality of security levels and providing a gate between the zones. In the case of performing personal authentication using face image collation at a gate provided between zones in such multilevel security gates, when the methods described in Patent Literature 1 and Patent Literature 2 are used, a collation threshold for the gate is changed according to the used state of the gate. Therefore, it is difficult to construct systematic security gates by linking a plurality of gates.

An exemplary object of the example embodiments is to provide a face authentication apparatus that solves the aforementioned problem.

A face authentication apparatus according to one aspect of the example embodiments includes a face image acquisition unit that acquires a face image of a user who passes through a first gate provided at a first boundary between a plurality of zones, a collation unit that performs face authentication on the face image on the basis of a threshold, an operating state acquisition unit that acquires an operating state of a second gate provided at a second boundary that is different from the first boundary, and a threshold change unit that changes the threshold on the basis of the operating state.

A face authentication method according to another aspect of the example embodiments includes acquiring a face image of a user who passes through a first gate provided at a first boundary between a plurality of zones, performing face authentication on the face image on the basis of a threshold, acquiring an operating state of a second gate provided at a second boundary that is different from the first boundary, and changing the threshold on the basis of the operating state.

A computer-readable medium, according to another aspect of the example embodiments, is a medium storing a program for causing a computer to function as a face image acquisition unit that acquires a face image of a user who passes through a first gate provided at a first boundary between a plurality of zones, a collation unit that performs face authentication on the face image on the basis of a threshold, an operating state acquisition unit that acquires an operating state of a second gate provided at a second boundary that is different from the first boundary, and a threshold change unit that changes the threshold on the basis of the operating state.

With the configurations described above, the example embodiments is able to construct systematic security gates by linking a plurality of gates.

BRIEF DESCRIPTION OF DRAWINGS

FIG. 2 illustrates an example of a personal authentication method performed at each gate of the multilevel security gates.

FIG. 6 illustrates examples of threshold change rules used in the first exemplary embodiment.

FIG. 7 illustrates examples of threshold change rules used in the first exemplary embodiment.

FIG. 8 illustrates examples of threshold change rules used in the first exemplary embodiment.

EXEMPLARY EMBODIMENTS

Next, exemplary embodiments will be described in detail with reference to the drawings.

First Exemplary Embodiment

Figure 1:
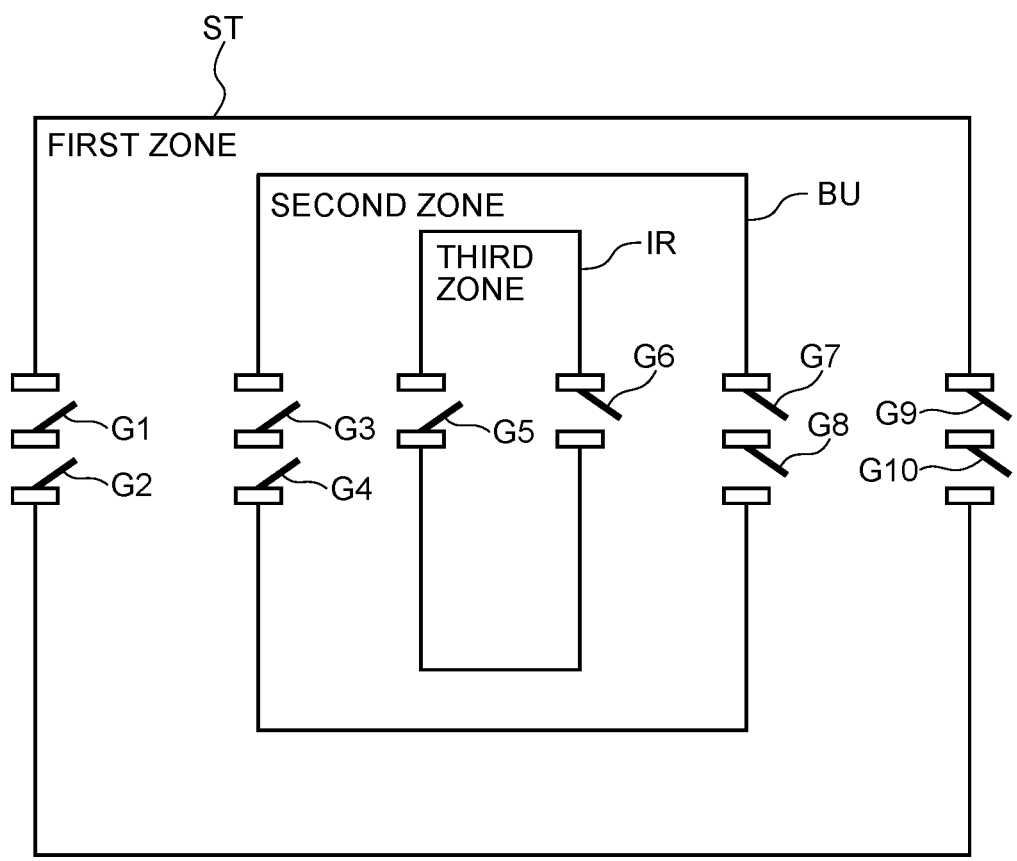
FIG. 1 is a schematic configuration diagram of multilevel security gates to which the example embodiments is applied.

FIG. 1 is a schematic configuration diagram of multilevel security gates to which the example embodiments is applied. The multilevel security gates illustrated in FIG. 1 include ten gates in total, namely gates G1 to G10. The gates G1 and G2 are provided as entry-only gates at the entrance of a site ST of the facilities, and the gates G9 and G10 are provided as exit-only gates at the exit of the site ST. The gates G3 and G4 are provided as entry-only gates at the entrance of a building BU in the site ST, and the gates G7 and G8 are provided as exit-only gates at the exit of the building BU. The gate G5 is provided as an entry-only gate at the entrance of an important room IR in the building BU, and the gate G6 is provided as an exit-only gate at the exit of the important room IR. In the multilevel security gates, the inside of the important room IR is set to be a third zone having the highest security level, the inside of the building BU except for the important room IR is set to be a second zone having the next highest security level, and the inside of the site ST except for the building BU is set to be a first zone having the next highest security level. Note that the security level of the outside of the site ST is lower than that of the first zone.

To enter the important room IR from the outside of the site ST, a user first enters the site ST via either the gate G1 or the gate G2. Then, the user enters the building BU via either the gate G3 or the gate G4, and then enters the important room IR via the gate G5. At this time, at the gates G1 to G5 through which the user passes, personal authentication is performed, and only when the authentication succeeds, the user can pass through the gate. In contrast, when going out of the important room IR to the outside of the site ST, the user first goes out of the important room IR via the gate G6. Then, the user goes out of the building BU via either the gate G7 or the gate G8, and then goes out of the site ST via the gate G9 or the gate G10. At this time, at the gates G6 to G10 through which the user passes, personal authentication is performed, and only when the authentication succeeds, the user can pass through the gates. Note that the use can go out of the building BU without entering the important room IR, or can go out of the site ST without entering the building BU.

As methods for personal authentication performed at the gates G1 to G10, various types of methods can be considered. Hereinafter, it is assumed that an authentication method as illustrated in FIG. 2 is employed at the gates G1 to G10, for the sake of explanation. Referring to FIG. 2, face authentication is used at all of the gates G1 to G10. Further, the gates G1 and G2 adopt two-factor authentication using IC card authentication in addition to the face authentication, and the gate G5 adopts two-factor authentication using password authentication in addition to the face authentication. FIG. 2 also illustrates that the initial set value of a collation threshold to be used for face authentication in each of the gates G1 to G10 is "large", "middle", or "small". "Large" puts emphasis on security, with which the false acceptance rate can be suppressed to be low. "Small" puts emphasis on convenience, with which the false rejection rate can be suppressed to be low. "Middle" is the intermediate between the both. While the value of the collation threshold is expressed as "large", "middle", or "small" in this example, it is represented by a numerical value actually. In that case, a numerical value corresponding to "large" is the largest, and a numerical value corresponding to "middle" is the next largest, and a numerical value corresponding to "small" is the smallest. In FIG. 2, the initial set value of the collation threshold for face authentication at the gates G1 and G2 is "small". This is a result of consideration that since two-factor authentication including IC card authentication and face authentication is performed at the gates G1 and G2, the overall security level is high even though the collation threshold for face authentication is set to be "small". For the same reason, the initial set value of the collation threshold for face authentication at the gate G5 is "small". Further, since the gates G6 to G10 are exit-only gates, the initial set values of the collation thresholds for face authentication are "small".

However, if the collation thresholds for face authentication at the gates G1 to G10 are fixed at the initial set values, it is impossible to flexibly cope with a change in the states. The art described in Patent Literatures 1 and 2 is to change collation thresholds of the gates G1 to G10 according to the used states of the respective gates G1 to G10. However, such art is insufficient. For example, at the gates G1 and G2 where two-factor authentication is used, when a situation allowing only one-factor authentication by IC card authentication or face authentication occurs due to a reason that a failure occurred in either the face authentication or the IC card authentication, the security in the first zone is lowered compared with the case of two-factor authentication. Therefore, if the collation threshold for face authentication of the gates G3 and G4 is kept as the initial set value "middle", the security in the second zone is also lowered. Further, at the gate G5 where two-factor authentication is used, if a situation allowing only one-factor authentication by password authentication or face authentication occurs due to a reason that a failure occurred in either the face authentication or the password authentication, the security in the third zone is lowered compared with the case of two-factor authentication. In that case, when the collation threshold for face authentication of the gates G3 and G4 is changed from "middle" to "large", the security in the second zone is enhanced, so that the security in the third zone can be enhanced accordingly. Besides the above-described case, there are various cases where it is desirable to change the collation threshold for face authentication of the gates G3 and G4 based on the operating states of other gates. The case where it is desirable to change the collation threshold for face authentication of the gates G3 and G4 on the basis of the operating states of other gates has been described. However, there are also cases where it is desirable to change the collation threshold for face authentication of gates other than the gates G3 and G4 on the basis of the operating states of other gates, of course. Further, there is also a case where it is desirable to change the collation thresholds for face authentication between the gate G3 and the gate G4 according to the operating states thereof. For example, when the gate G4 is stopped and closed due to any failure, only the gate G3 serves as an entry path from the first zone to the second zone, whereby congestion may occur at the gate G3. In that case, when the collation threshold for face authentication of the gate G3 is changed to "small", the false rejection rate is decreased and the number of passing users per unit time is increased, whereby congestion can be prevented.

Hereinafter, the gate G3 will be described as a gate that is configured to change the collation threshold for face authentication on the basis of the operating states of other gates, and a face authentication apparatus applied to the gate G3 will is described in detail as a first exemplary embodiment.

Figure 3:
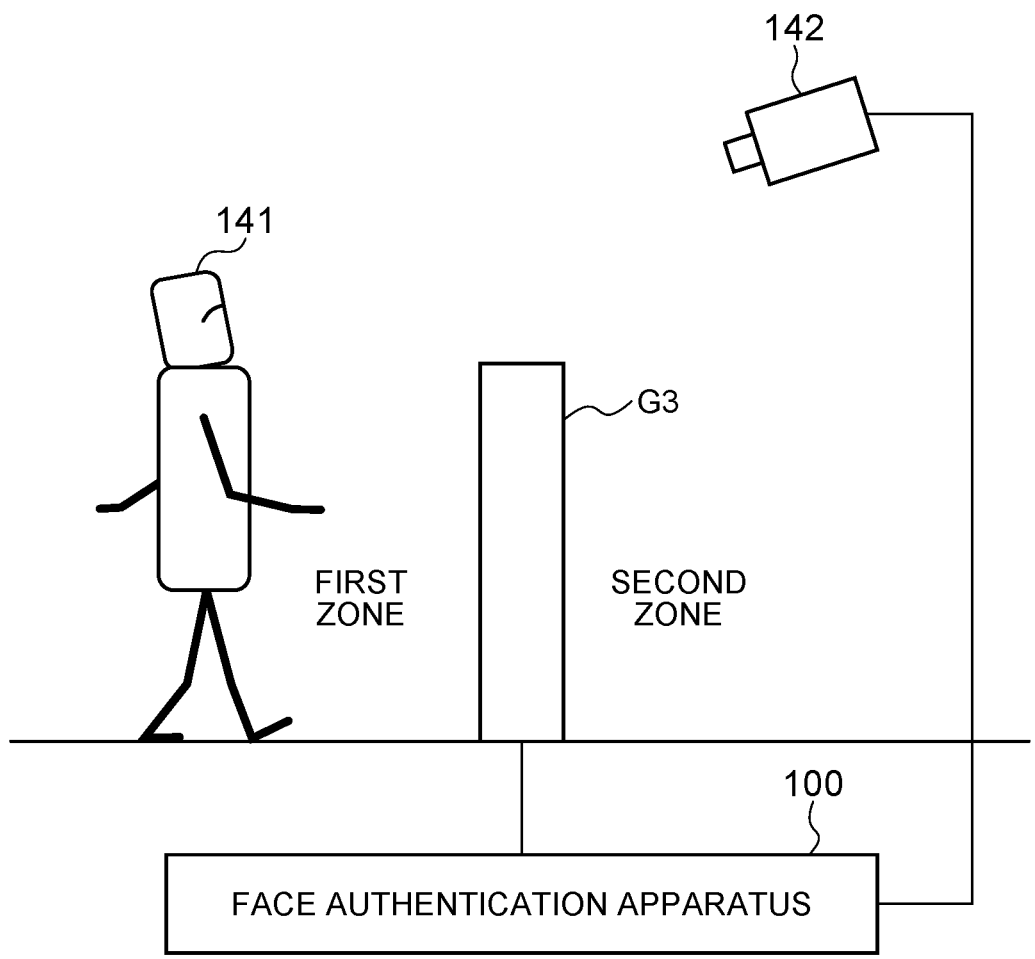
FIG. 3 illustrates the outline of a face authentication apparatus according to a first exemplary embodiment.

FIG. 3 illustrates the outline of a face authentication apparatus 100 according to the first exemplary embodiment. Referring to FIG. 3, the face authentication apparatus 100 is configured to perform face authentication on a user 141 who passes through the gate G3, provided between the first zone and the second zone, from the first zone to the second zone, and transmit the authentication result to the gate G3.

The gate G3 performs predetermined operation according to the received authentication result. The gate G3 can operate arbitrarily when receiving the authentication result. For example, the gate G3 automatically performs open/close operation of the door attached to the gate G3 according to the authentication result. The gate G3 may include a gate bar that is manually openable/closable, and release lock of the gate bar for a certain period of time only when an authentication result indicating authentication success is received. The gate G3 may output a message of passage propriety visually or by sound from an alarm provided to the gate G3 according to the authentication result. The gate G3 may be a stationary type, or a portable type that can be moved. The gate G3 may be an apparatus independent of the face authentication apparatus 100, or an apparatus integrated with the face authentication apparatus 100.

Figure 4:
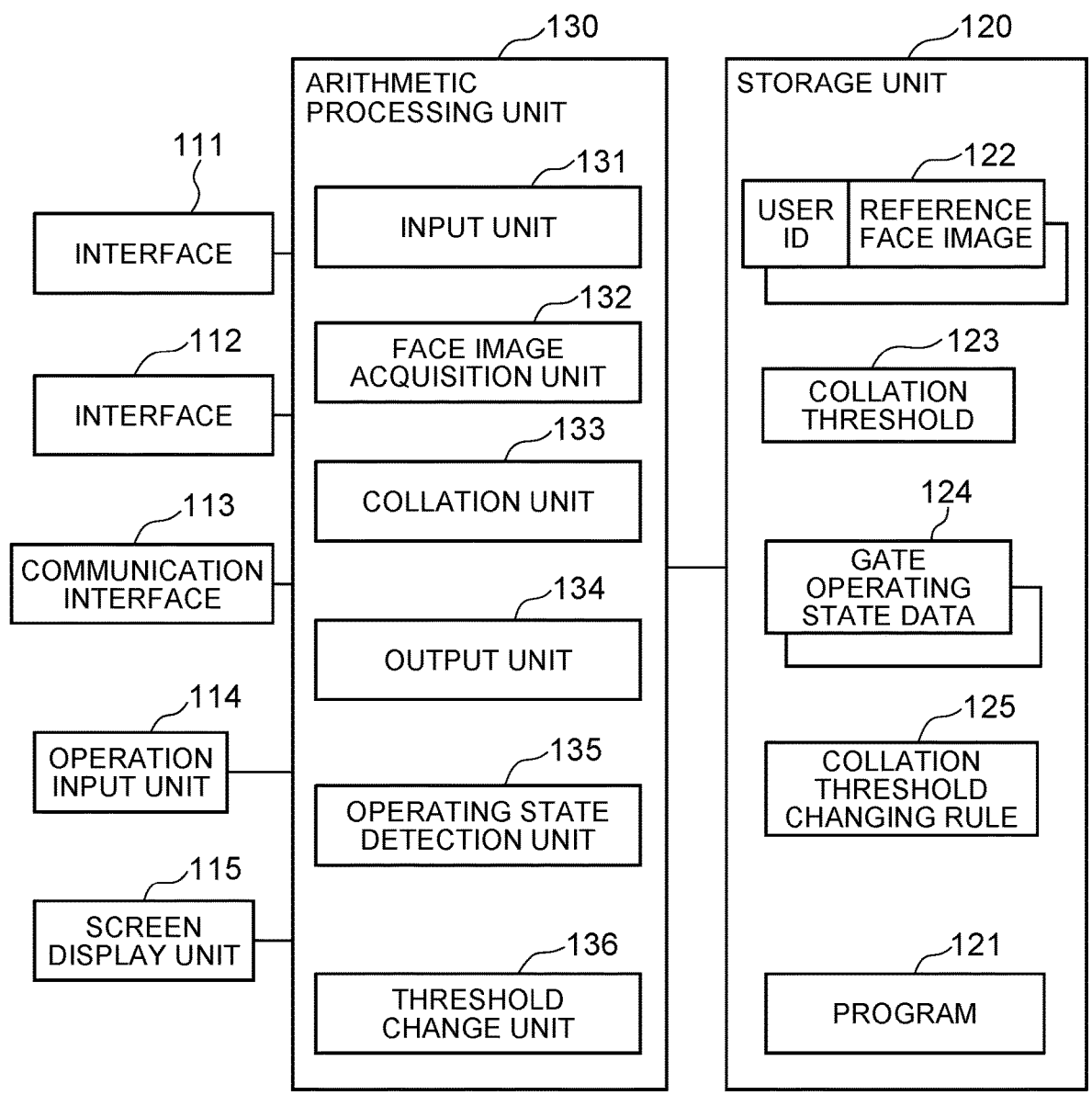
FIG. 4 is a block diagram of the face authentication apparatus according to the first exemplary embodiment.

FIG. 4 is a block diagram of the face authentication apparatus 100. Referring to FIG. 4, the face authentication apparatus 100 includes an interface 111 with the gate G3, an interface 112 with a camera unit 142, a communication interface 113, an operation input unit 114, a screen display unit 115, a storage unit 120, and an arithmetic processing unit 130.

The interface 111 is configured to transmit and receive signals such as results of face authentication to and from the gate G3. Transmission and reception of signals may be performed in a wired or wireless manner.

The interface 112 is configured to transmit and receive signals to and from the camera unit 142. Transmission and reception of signals may be performed in a wired or wireless manner. As illustrated in FIG. 3, the camera unit 142 is set in advance at a position with an image angle where the camera unit 142 can image a face portion of the user 141 moving from the first zone to the second zone via the gate G3. The camera unit 142 is an imaging device configured of a Charge Coupled Device (CCD), a Complementary Metal-Oxide Semiconductor (CMOS) device, or the like that outputs image data captured by imaging a face portion of a person who passes through the gate G3. The image data captured by the camera unit 142 is, for example, a black-and-white gradation image of 256 gradations but may be a color image.

The communication interface 113 is a communication apparatus that performs data communication with a face authentication apparatus, not illustrated, provided to each of the gates G1, G2, and G4 to G10 other than the gate G3 illustrated in FIG. 1 and an external apparatus such as a terminal. The communication system may be wired or wireless communication.

The operation input unit 114 includes an input device such as a keyboard and numeric keys, and is configured to detect an operation by an operator and output it to the arithmetic processing unit 130.

The screen display unit 115 is a screen display device such as a liquid crystal display (LCD) or a plasma display panel (PDP). The screen display unit 115 is configured to display various types of information such as an operation menu on a screen according to an instruction from the arithmetic processing unit 130.

The storage unit 120 is a storage device such as a hard disk or a memory. The storage unit 120 is configured to store processing information and a program 121 necessary for various types of processing to be performed in the arithmetic processing unit 130.

The program 121 implements various processing units by being read into the arithmetic processing unit 130 and executed. The program 121 is read, in advance, from an external device (not illustrated) or a storage medium (not illustrated) via a data input/output function such as the communication interface 113, and is stored in the storage unit 120.

Main processing information stored in the storage unit 120 includes reference face image data 122, a collation threshold 123, gate operating state data 124, and a collation threshold changing rule 125.

The reference face image data 122 is data in which a face image serving as a reference to be used when face authentication is performed and a user ID is associated with each other. In the reference face image data 122, at least one face image of a person having a user ID may be held in association with the user ID as a reference face image. Alternatively, in the reference face image data 122, the feature amount of a face extracted from a face image of a person having a user ID may be associated with the user ID as reference face information. Here, the feature amount of a face is a numerical value representing a feature of each part in a face image for recognizing the positional relationship or shape of each part such as eye, nose, or eyebrow constituting the face, and is used for similarity determination or the like between images.

The collation threshold 123 is a threshold to be used for collation of a face image of a user captured by the camera unit 142. In the example embodiment, the collation threshold 123 is shared by every user ID.

Figure 5:
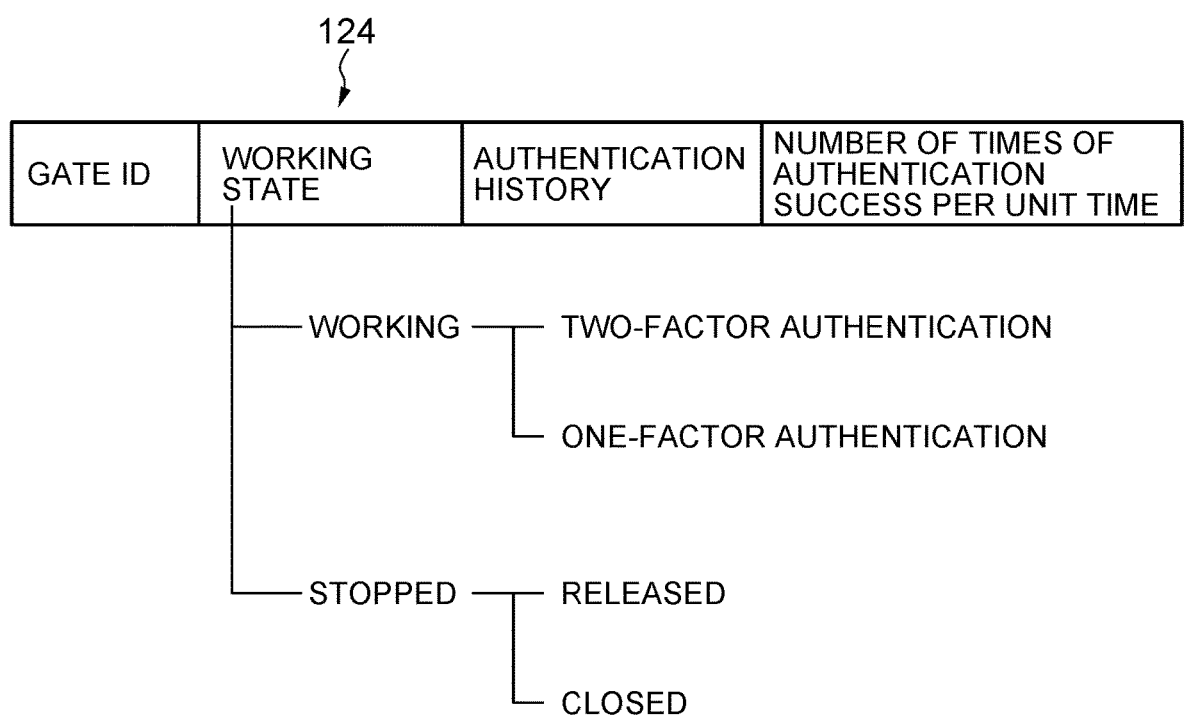
FIG. 5 illustrates an example of gate operating state data used in the first exemplary embodiment.

The gate operating state data 124 is data representing operating states of the gates G1 to G10 provided to the facilities. FIG. 5 illustrates an example of the gate operating state data 124. In this example, the gate operating state data 124 is present for each gate provided to the facilities, and is configured of gate ID, working state, authentication history, and the number of times of authentication success per unit time. The gate ID is gate identification information that uniquely identifies the gate. The working state represents whether it is working or stopped, and when it is working, represents whether it is working under two-factor authentication or one-factor authentication, while when it is stopped, whether it is released for free passage or it is closed so that passage is physically blocked. That is, the working state represents any of the four types, namely, working under two-factor authentication, working under one-factor authentication, released, and closed. For example, when the gate cannot be used because it is failed or under construction, it is closed or released. Further, at the gates G1, G2, and G5 which perform two-factor authentication, when it is switched to one-factor authentication due to a failure or the like, the working state is switched from working under two-factor authentication to working under one-factor authentication.

The authentication history is history of personal authentication, in which a set of the user ID of a person whose authentication succeeded at the gate and the authentication time is stored as history. The authentication history also includes information of whether or not authentication of a predetermined specific person succeeded. The user ID of a person deemed to be a specific person is set in advance. The number of times of authentication success per unit time represents the number of times of authentication success in the latest predetermined time (for example, ten minutes).

The collation threshold changing rule 125 is a rule to change the collation threshold 123 for face authentication at the gate G3 on the basis of the operating states of other gates. The collation threshold changing rule 125 includes a condition section describing a condition that the operating states of other gates should be satisfied, and a conclusion section describing a value, after being changed, of the collation threshold for face authentication at the gate G3 when the condition of the condition section is satisfied. However, the collation threshold changing rule 125 is not limited to have a rule form configured of the condition section and the conclusion section, but may be a rule having any form.

FIGS. 6 to 8 illustrate examples of the collation threshold changing rule 125. A rule 125-1 defines that if the working states of both the gate G1 and the gate G2 are "released" (condition section), the collation threshold for face authentication at the gate G3 is set to be "large", and the priority is 1. The priority indicates that as the numerical value is smaller, the priority is higher. Therefore, priority 1 is the highest. A rule 125-2 defines that if the working states of both the gate G1 and the gate G2 are "working with two-factor authentication" (condition section), the collation threshold for face authentication at the gate G3 is set to be "middle", and the priority is 4. When the gates G1 and G2 stop working and are released due to a failure or construction, the security in the first zone is lowered, which causes the security in the second zone to be lowered as well. Therefore, the rule 125-1 is a rule for preventing the security in the second zone from being lowered, by changing the collation threshold for face authentication at the gate G3 to "large". Also, the rule 125-2 is a rule to return the collation threshold for face authentication at the gate G3 to the initial state when the failure in the gate G1 and the gate G2 is repaired and the operation is resumed. Note that in the face authentication apparatus that controls the gate G4, the collation threshold for face authentication at the gate G4 is to be changed under the rules similar to the rules 125-1 and 125-2.

A rule 125-3 defines that if the working states of both the gate G1 and the gate G2 are "working with one-factor authentication" (condition section), the collation threshold for face authentication at the gate G3 is set to be "large", and the priority is 1. When the gates G1 and G2 are degenerated to one-factor authentication, the security in the first zone is lowered, which causes the security in the second zone to be lowered as well. Therefore, the rule 125-3 is a rule for preventing the security in the second zone from being lowered, by changing the collation threshold for face authentication at the gate G3 to "large". Note that when the working states of the gates G1 and G2 are returned to the state of "working with two-factor authentication", the collation threshold for face authentication at the gate G3 is returned to the initial state by the rule 125-2.

A rule 125-5 defines that if the working state of the gate G5 is "working with one-factor authentication" (condition section), the collation threshold for face authentication at the gate G3 is set to be "large", and the priority is 1. A rule 125-6 defines that if the working state of the gate G5 is "working with two-factor authentication" (condition section), the collation threshold for face authentication at the gate G3 is set to be "middle", and the priority is 4. When the gate G5 is degenerated to one-factor authentication, the security in the third zone is lowered. In order to compensate it, the rule 125-5 is a rule for enhancing the security in the second zone. The rule 125-6 is a rule to return the collation threshold for face authentication at the gate G3 to the initial state when the state of the gate G5 is returned to "two-factor authentication". Note that in the face authentication apparatus that controls the gate G4, the collation threshold for face authentication at the gate G4 is to be changed under the rules similar to the rules 125-5 and 125-6.

A rule 125-7 defines that if authentication of a specific person has succeeded at the gate G1 or the gate G2 (condition section), the collation threshold for face authentication at the gate G3 is set to be "large", and the priority is 2. The user ID of a person deemed to be a specific person is set in advance. A rule 125-8 defines that if authentication of a specific person has succeeded at the gate G9 or the gate G10 (condition section), the collation threshold for face authentication at the gate G3 is set to be "middle", and the priority is 2. The rule 125-7 is a rule for, when a specific person has entered the first zone from the entrance of the site, enhancing the security in the second zone where the specific person may enter thereafter. The rule 125-8 is a rule to return the collation threshold for face authentication at the gate G3 to the initial state when the specific person goes out of the site. Note that in the face authentication apparatus that controls the gate G4, the collation threshold for face authentication at the gate G4 is to be changed under the rules similar to the rules 125-7 and 125-8. In the rule 125-7, the degree of importance of a specific person is not taken into consideration. However, specific persons may be put into a plurality of groups by the degree of importance, and the degree of changing the collation threshold may be adjusted according to the degree of importance of a specific person who enters the first zone.

A rule 125-9 defines that if the number of times of authentication success per unit time at the gate G1 and the gate G2 is equal to or larger than a predetermined value (condition section), the collation threshold for face authentication at the gate G3 is set to be "small", and the priority is 3. A rule 125-10 defines that if the number of times of authentication success per unit time at the gate G1 and the gate G2 is smaller than the predetermined value (condition section), the collation threshold for face authentication at the gate G3 is set to be "middle", and the priority is 3. When the flow rate of users who pass through the gates G1 and G2 increases, there is a possibility that the flow rate of users who pass through the gate G3 also increases. Therefore, the rule 125-9 is a rule for preventing congestion at the gate G3 in advance, by setting the collation threshold for face authentication to be "smaller" before an increase in the flow rate at the gate G3 to reduce the false rejection rate. Also, the rule 125-10 is a rule to return the collation threshold for face authentication at the gate G3 to the initial state immediately when the flow rate of users from the gates G1 and G2 decreases. Note that in the face authentication apparatus that controls the gate G4, the collation threshold for face authentication at the gate G4 is to be changed according to the rules similar to the rules 125-9 and 125-10.

A rule 125-11 defines that if the working state of the gate G4 is "closed" (condition section), the collation threshold for face authentication at the gate G3 is set to be "small", and the priority is 3. A rule 125-12 defines that if the working state of the gate G4 is "working with one-factor authentication" (condition section), the collation threshold for face authentication at the gate G3 is set to be "middle", and the priority is 4. When the working state of the gate G2 is stopped and the gate is closed, the gate G3 is the only entry path from the first zone to the second zone. Therefore, the rule 125-11 is a rule for preventing congestion at the gate G3, by changing the collation threshold for face authentication at the gate G3 to be "small" to thereby lower the false rejection rate. The rule 125-12 is a rule to return the collation threshold for face authentication at the gate G3 to the initial state when the closed state of the gate G4 is solved. Note that in the face authentication apparatus that controls the gate G4, the collation threshold for face authentication at the gate G4 is to be changed according to the rules similar to the rules 125-11 and 125-12.

Referring to FIG. 4 again, the arithmetic processing unit 130 is an arithmetic processing unit having a microprocessor such as an MPU and its peripheral circuits. The arithmetic processing unit 130 is configured to read the program 121 from the storage unit 120 and executes it to thereby allow the hardware and the program 121 to operate in cooperation with each other to implement various processing units. The processing units implemented by the arithmetic processing unit 130 includes the input unit 131, the face image acquisition unit 132, the collation unit 133, the output unit 134, the operating state detection unit 135, and the threshold change unit 136.

The input unit 131 is configured to receive the reference face image data 122, the collation threshold 123, and the collation threshold changing rule 125 input from the outside via the communication interface 113 or the operation input unit 114, and store them in the storage unit 120. The input unit 131 is also configured to receive the gate operating state data 124 of the respective gates G1 to G10 in the initial states, input from the outside via the communication interface 113 or the operation input unit 114, and store them in the storage unit 120. The gate operating state data of the initial state is configured such that the fields of gate ID and working state are filled with corresponding contents, and the fields of authentication history and the number of times of authentication success per unit time are blank.

The face image acquisition unit 132 is configured to receive image data captured by imaging a face of a person who is an authentication target from the camera unit 142, and acquire (detect) a face image of the authentication target from the image data. The face image acquisition unit 132 performs matching between a template representing a general face contour of a person and the image data to thereby acquire a face image existing in the image data.

Besides template matching, various publicly-known face detection algorithms may be used. The collation unit 133 is configured to calculate, for each user ID, similarity between the face image of the authentication target acquired by the camera unit 142 and a reference face image included in the reference face image data 122, and based on the result of comparing the calculated similarity for each user ID with the collation threshold 123, determine whether or not the face image of the authentication target matches any reference face image included in the reference face image data 122. As an example of similarity, a cross-correlation coefficient between face images may be used. In that case, the similarity is high when a face portion of the same person is included in the two face images, and the similarity is low when face portions of different persons are included in the two face images. As similarity between face images, besides the cross-correlation coefficient, a publicly-known similarity calculation technique may be used. For example, the collation unit 133 may be configured to extract a feature amount of the face from the face image of the authentication target, collate the feature amount of the reference face included in the reference face image data 122 with the feature amount of the face extracted from the face image of the authentication target, and calculate the similarity between the reference face image and the face image of the authentication target.

The collation unit 133 is also configured to, when there is no reference face image in the reference face image data 122 that the similarity with the face image of the authentication target acquired by the camera unit 142 is equal to or larger than the collation threshold 123, generate an authentication result representing authentication failure and transmit the result to the output unit 134. The collation unit 133 is also configured to, when there is at least one reference face image that the similarity with the face image of the authentication target acquired by the camera unit 142 is equal to or larger than the collation threshold 123, generate an authentication result representing authentication success including the user ID of the maximum similarity and the authentication time, and transmit the result to the output unit 134 and the operating state detection unit 135.

The output unit 134 is configured to transmit the authentication result generated by the collation unit 133 to the gate G3 via the interface 111. The output unit 134 may transmit the authentication result to an external terminal via the communication interface 113 and/or display it on the screen display unit 115.

The operating state detection unit 135 is configured to periodically detect data representing the operating states of the gates provided to the site, and store it in the storage unit 120. The operating state detection unit 135 is configured to detect the gate operating state of the gate G3 and detect gate operating states of the gates other than the gate G3, namely G1, G2, and G4 to G10. The operating state detection unit 135 is also referred to an operating state acquisition unit.

The operating state detection unit 135 detects the gate operating state of the gate G3 as described below. When the working state of the gate G3 is input from the administrator via the operation input unit 114 or the communication interface 113, the operating state detection unit 135 stores, in the storage unit 120, the input working state as the working state of the gate operating state data 124 of the gate G3. Further, when an authentication result indicating authentication success is transmitted from the collation unit 133, the operating state detection unit 135 registers the authentication result in the authentication history of the gate operating state data 124 of the gate G3. At that time, the operating state detection unit 135 compares the user ID included in the authentication result with the user ID of a person deemed as a specific person, and when they match, the operating state detection unit 135 records the fact that personal authentication of the specific person has succeeded in the authentication history of the gate operating state data 124 of the gate G3. The operating state detection unit 135 also calculates the number of times of authentication success per unit time on the basis of the authentication results indicating authentication success transmitted from the collation unit 133, and registers it in the gate operating state data 124 of the gate G3.

Meanwhile, the operating state detection unit 135 periodically transmits the gate operating state data 124 of the gate G3 stored in the storage unit 120, to the face authentication apparatuses of the gates G1, G2, and G4 to G10 via the communication interface 113. The operating state detection unit 135 also receives the gate operating state data 124 of the gates G1, G2, and G4 to G10 periodically transmitted from the face authentication apparatuses of the gates G1, G2, and G4 to G10, and updates the gate operating state data 124 of the gates G1, G2, and G4 to G10 stored in the storage unit 120. That is, the operating state detection unit 135 detects the gate operating states of the gates other than the gate G3 by receiving the gate operating state data 124 periodically transmitted from the face authentication apparatuses of the other gates.

The threshold change unit 136 is configured to change the collation threshold 123 on the basis of the gate operating state data 124 and the collation threshold changing rule 125 stored in the storage unit 120. Specifically, the threshold change unit 136 determines whether or not the condition section of the collation threshold changing rule 125 is satisfied on the basis of the gate operating state data 124, and changes the collation threshold 123 according to the conclusion section of the collation threshold changing rule 125 in which the condition section is satisfied. When the condition sections of a plurality of collation threshold changing rules 125 are satisfied simultaneously, the threshold change unit 136 changes the collation threshold 123 in accordance with the conclusion section of the collation threshold changing rule 125 having the highest priority among them. When there are a plurality of collation threshold changing rules 125 having the highest priority, a predetermined criterion will be followed. For example, when a security-oriented criterion is set in advance, the threshold change unit 136 applies, in preference, one in which the value of the collation threshold 123 after the change becomes the largest, among the conclusion sections of the collation threshold changing rules 125 having the highest priority. On the contrary, when a convenience-oriented criterion is set in advance, the threshold change unit 136 applies, in preference, one in which the value of the collation threshold 123 after the change becomes the smallest, among the conclusion sections of the collation threshold changing rules 125 having the highest priority.

Figure 9:
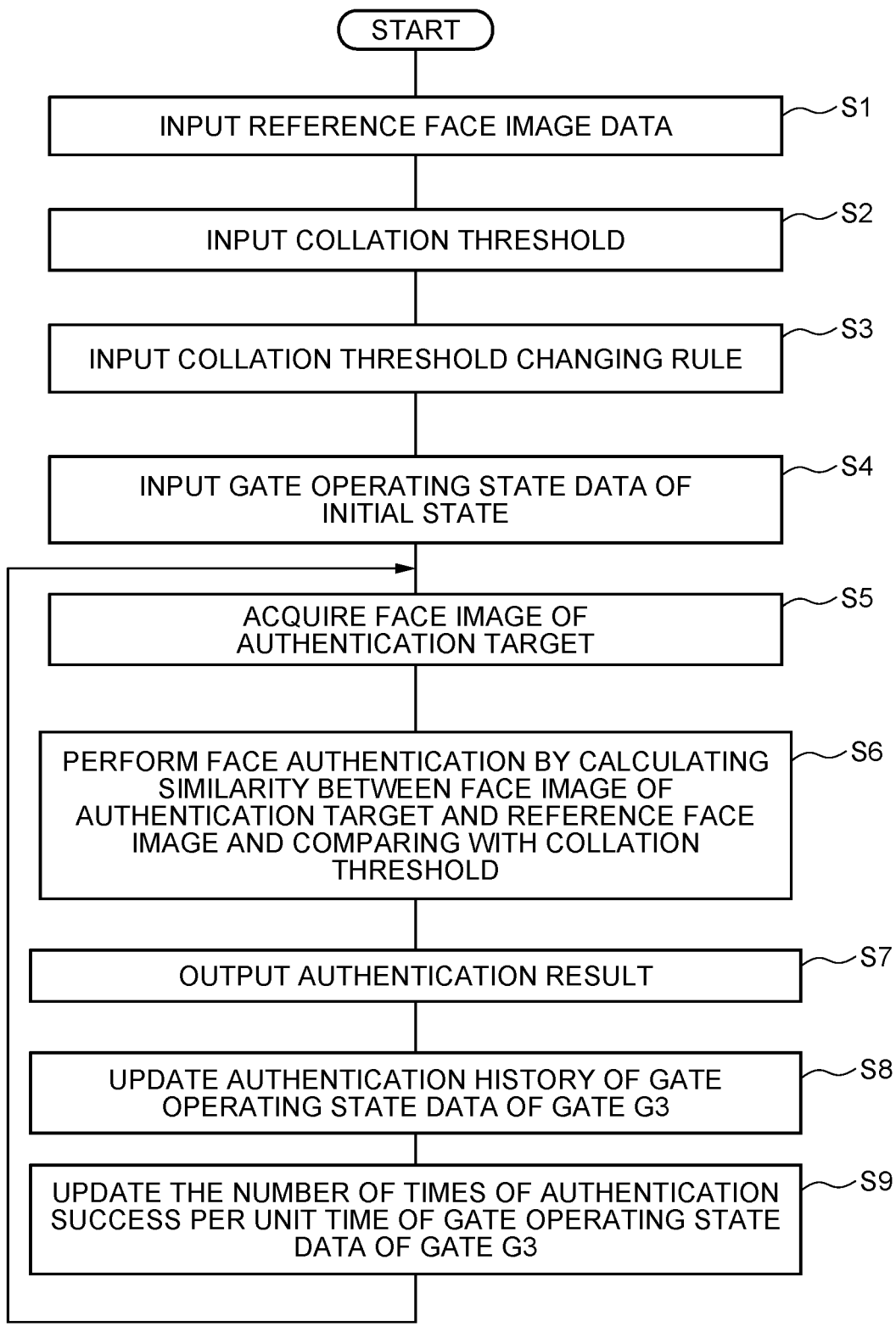
FIG. 9 is a flowchart illustrating an overall operation of the face authentication apparatus according to the first exemplary embodiment.

FIG. 9 is a flowchart illustrating the overall operation of the face authentication apparatus 100. Referring to FIG. 9, first, the input unit 131 of the face authentication apparatus 100 receives the reference face image data 122 input from the outside, and stores it in the storage unit 120 (step S1). Then, the input unit 131 receives the collation threshold 123 input from the outside, and stores it in the storage unit 120 (step S2). Then, the input unit 131 receives the collation threshold changing rule 125 input from the outside, and stores it in the storage unit 120 (step S3). Then, the input unit 131 receives the gate operating state data 124 in the initial state of the respective gates G1 to G10, and stores it in the storage unit 120 (step S4). The processes of steps S1 to S4 described above are preparation processes for starting operation of face authentication at the gate G3, and may be omitted if they have been performed once.

Next, the face image acquisition unit 132 of the face authentication apparatus 100 receives image data, captured by imaging a face portion of the user 141 who moves from the first zone to the second zone, input from the camera unit 142 via the interface 112, and acquires a face image of the authentication target from the image data (step S5). Then, the collation unit 133 of the face authentication apparatus 100 calculates similarity between the face image of the authentication target and the reference face image included in the reference face image data 122, and compares the calculated similarity with the collation threshold 123, to thereby determine whether or not the face image of the authentication target matches any reference face image included in the reference face image data 122 (step S6). If there is no reference face image that the similarity with the face image of the authentication target is equal to or larger than the collation threshold 123 in the reference face image data 122, the collation unit 133 generates an authentication result indicating authentication failure and transmits the result to the output unit 134. When there is at least one reference face image that the similarity with the face image of the authentication target is equal to or larger than the collation threshold 123, the collation unit 133 generates an authentication result indicating authentication success including the user ID of the maximum similarity and the authentication time, and transmits the result to the output unit 134 and to the operating state detection unit 135. Then, the output unit 134 of the face authentication apparatus 100 transmits the authentication result to the gate G3 via the interface 111 (step S7).

In the case of authentication success, the operating state detection unit 135 registers the authentication result in the authentication history of the gate operating state data 124 of the gate G3, and in the case of authentication success of a specific person, records the fact in the authentication history (step S8). Also, in the case of authentication success, the operating state detection unit 135 calculates the number of times of authentication success per unit time, and updates the number of times of authentication success per unit time of the gate operating state data 124 of the gate G3 (step S9). Then, the face authentication apparatus 100 returns to step S5 and repeats the same processes as those described above.

Figure 10:
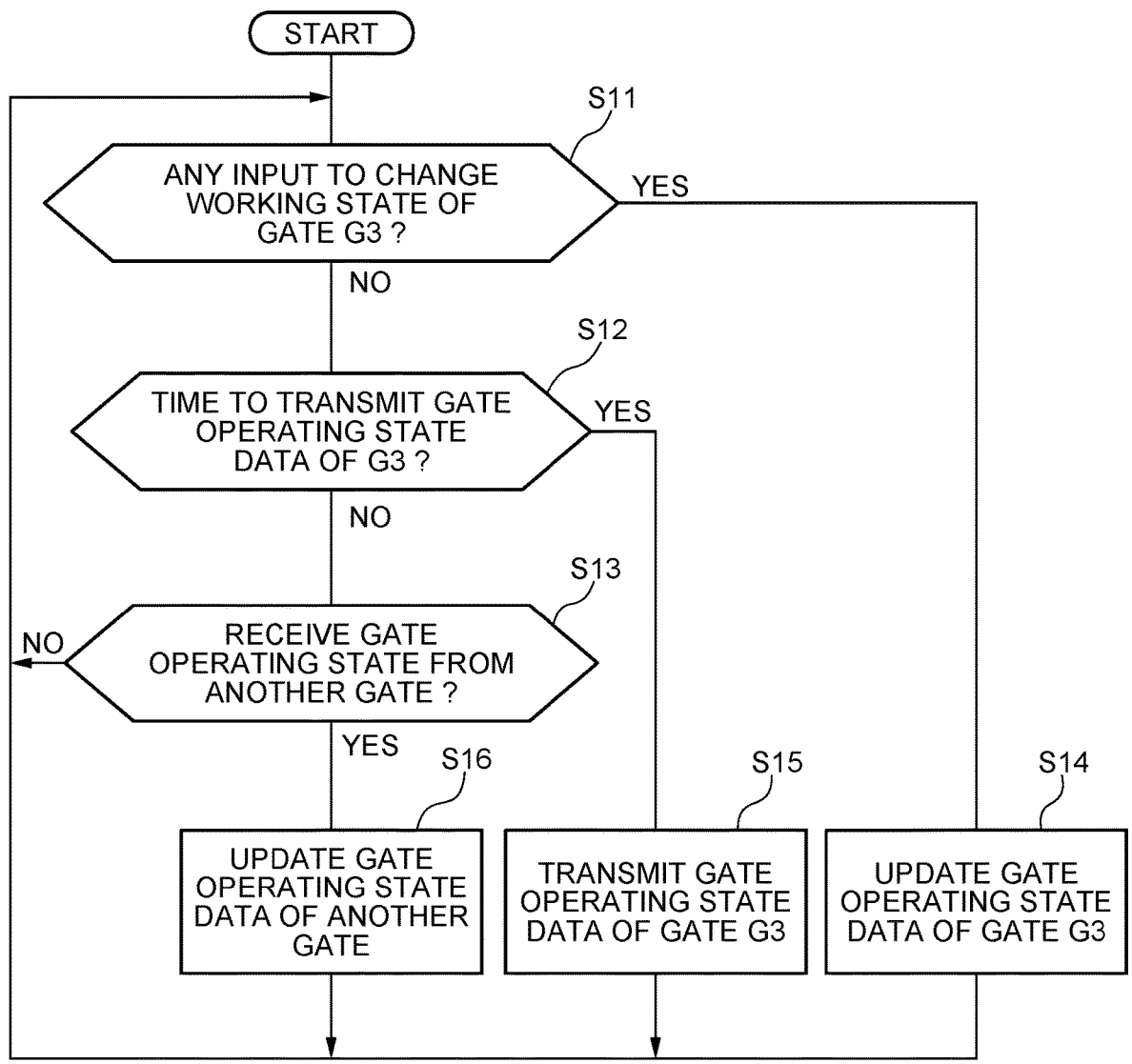
FIG. 10 is a flowchart illustrating an exemplary operation of an operating state detection unit of the face authentication apparatus according to the first exemplary embodiment.

The face authentication apparatus 100 also performs processing illustrated in FIG. 10 parallel to the processing illustrated in FIG. 9. Referring to FIG. 10, the operating state detection unit 135 of the face authentication apparatus 100 regularly detects whether or not there is an input from the administrator to change the working state of the gate G3, whether or not the time to transmit gate operating state data of the gate G3 arrives, and whether or not gate operating state data is received from another gate (steps S11 to S13).

When an input is made from the administrator to change the working state of the gate G3, the operating state detection unit 135 updates the working state in the gate operating state data 124 of the gate G3 stored in the storage unit 120 in accordance with the input (step S14), and returns to step S11 and repeats the same processes as those described above. When the time to transmit gate operating state data of the gate G3 has arrived, the operating state detection unit 135 transmits the gate operating state data of the gate G3 stored in the storage unit 120 to the face authentication apparatuses of the other gates G1, G2, and G4 to G10 via the communication interface 113 (step S15), and returns to steps S11 and repeats the same processes as those described above. The time to transmit the gate operating state data of the gate G3 may be when a predetermined period of time has passed from the time of previous transmission, when the gate operating state data of the gate G3 is updated by steps S8, S9, and S14 after the time of previous transmission, or the like. Further, when the operating state detection unit 135 receives gate operating state data from another gate via the communication interface 113, the operating state detection unit 135 updates the gate operating state data of the other gate stored in the storage unit 120 with the received gate operating state data (step S16), and returns to step S11 and repeats the same processes as those described above.

Figure 11:
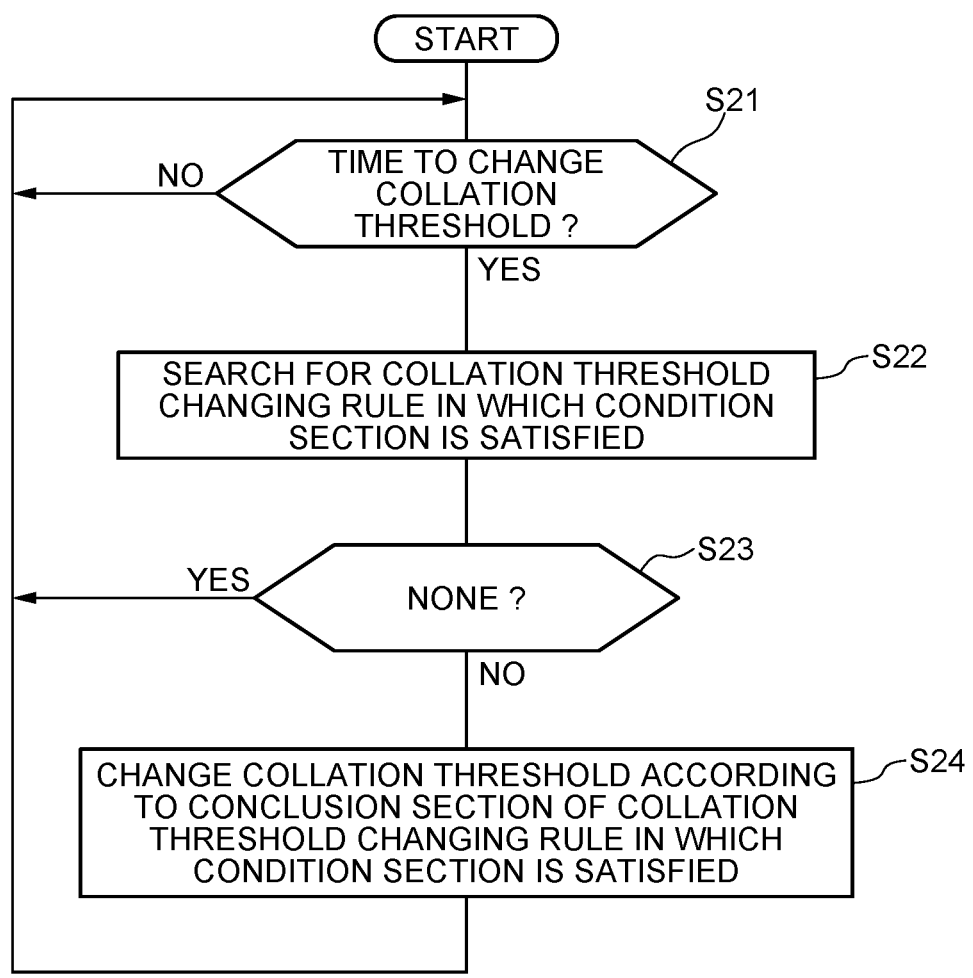
FIG. 11 is a flowchart illustrating an exemplary operation of a threshold change unit of the face authentication apparatus according to the first exemplary embodiment.

The face authentication apparatus 100 also performs processing illustrated in FIG. 11 parallel to the processing illustrated in FIGS. 9 and 10. Referring to FIG. 11, the threshold change unit 136 of the face authentication apparatus 100 determines whether or not the time to change the collation threshold arrives (step S21). The time to change the collation threshold may be the time when a predetermined period of time has passed from the time of previous change, when the gate operating state data 124 of another gate is changed after the time of previous change, or the like.

When the time to change the collation threshold arrives, the threshold change unit 136 checks the collation threshold changing rule 125 in which the condition section is satisfied (step S22). That is, the threshold change unit 136 reads the collation threshold changing rule 125 stored in the storage unit 120 one by one, collates it with the gate operating state data 124, to thereby determine whether or not the condition section of the rule is satisfied. When there is no collation threshold changing rule 125 in which the condition section is satisfied (YES at step S23), the threshold change unit 136 returns to step S21 and repeats the same processes as those described above.

On the other hand, when there is at least one collation threshold changing rule 125 in which the condition section is satisfied, the threshold change unit 136 updates the collation threshold 123 according to the conclusion section of the collation threshold changing rule in which the condition section is satisfied (step S24). Then, the threshold change unit 136 returns to step S21 and repeats the same processes as those described above.

As described above, according to the face authentication apparatus 100 of the example embodiment, a collation threshold used for face authentication performed at the gate G3 provided between the first zone and the second zone is automatically changed according to the operating states of other gates such as the gates G1 and G2 provided between the outside of the site and the first zone, and the gate G5 provided between the second zone and the third zone. Therefore, systematic security gates can be constructed by linking a plurality of gates.

In the description provided above, it is assumed that the gates G1 to G5 are entry-only gates, and the gates G6 to G10 are exit-only gates. However, the gates G1 to G10 may be gates that can be used for both entry and exit. A face authentication apparatus of a gate used for both entry and exit is configured to perform face authentication on a person who enters and also perform face authentication on a person who goes out. A common collation threshold may be used for entry and exit, or different collation thresholds may be used.

In the above description, while a collation threshold for face authentication is shared by every user ID, a collation threshold may be set for each user ID. In the case of setting a collation threshold for each user ID, it is possible to designate a user ID to be changed in the collation threshold changing rule. For example, in the rule 125-7 of FIG. 7 in which the collation threshold for face authentication at the gate G3 is changed to "large" when authentication of a specific person has succeeded at the gate G1 or G2, the collation threshold corresponding to the specific person may be excluded from the change target.

In the above description, while authentication of a person who passes through each of the gates G1 to G10 is performed with use of a face authentication apparatus corresponding to each of the gates G1 to G10 one to one, it is possible to share one face authentication apparatus by all of the gates or some of the gates to perform authentication.

In the above description, while the collation unit 133 collates a face image of the authentication target with reference face images of all registered users previously registered, it is possible to limit registered users on which collation is performed. For example, users who pass through the gate G3 of FIG. 1 are limited to uses who entered the first zone through the gate G1 or the gate G2. Therefore, the collation unit 133 of the face authentication apparatus corresponding to the gate G3 may perform collation by limiting the users to those who recorded in the authentication history of the gate operating state data 124 of the gates G1 and G2. Specifically, the collation unit 133 detects users recorded in the authentication history of the gate operating state data 124 of the gates G1 and G2 as visitors of the first zone, selects the reference face images of the visitors from the reference face image data 122 of respective registered users, calculates similarity between each of the selected reference face images with the face image of the user who passes through the gate G3 and compares it with the threshold, to thereby perform personal authentication. Alternatively, in order to further limit registered users on which collation is to be performed, it is possible to exclude, from the visitors of the first zone detected as described above, the users who went out of the site from the gate G9 or the gate G2, or exclude, from the visitors of the first zone detected as described above, the users who passed through the gate G3 or G4 but did not pass through the gate G7 or G8. As described above, by limiting the users who pass through the gate G3 to the visitors of the first zone, it is possible to enhance the authentication accuracy. In the case of limiting the users who pass through the gate G3 to the visitors of the first zone as described above, a larger collation threshold may be set.

Second Exemplary Embodiment

Figure 12:
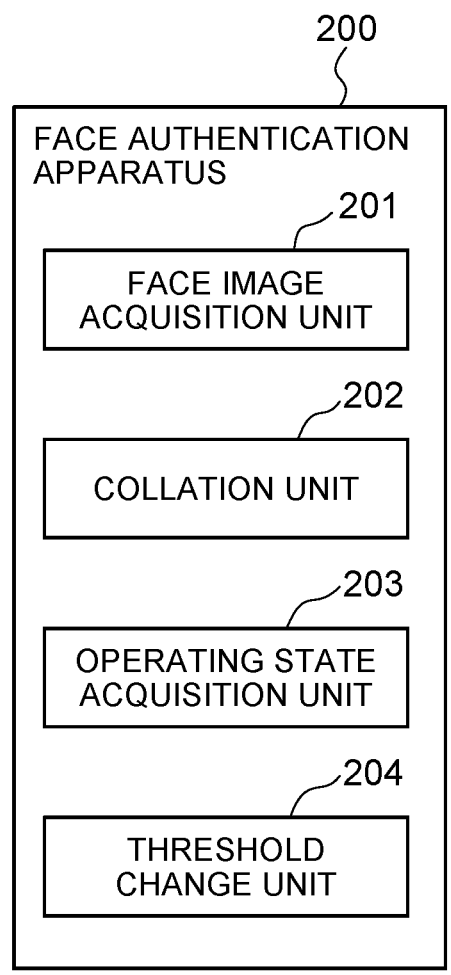
FIG. 12 is a block diagram of a face authentication apparatus according to a second exemplary embodiment.

FIG. 12 is a block diagram of a face authentication apparatus according to a second exemplary embodiment. Referring to FIG. 12, a face authentication apparatus 200 of the example embodiment includes a face image acquisition unit 201, a collation unit 202, an operating state acquisition unit 203, and a threshold change unit 204.

The face image acquisition unit 201 is configured to acquire a face image of a user who passes through a first gate provided at a first boundary between zones. The face image acquisition unit 201 may have a configuration similar to that of the face image acquisition unit 132 of FIG. 4, but it is not limited thereto.

The collation unit 202 is configured to perform face authentication on the face image acquired by the face image acquisition unit 201 on the basis of a threshold. The collation unit 202 may have a configuration similar to the collation unit 133 of FIG. 4 for example, but is not limited thereto.

The operating state acquisition unit 203 is configured to acquire an operating state of a second gate provided at a second boundary that is different from the first boundary. The operating state acquisition unit 203 may have a configuration similar to that of the operating state detection unit 135 of FIG. 4 for example, but it is not limited thereto.

The threshold change unit 204 is configured to change a threshold for collation to be used by the collation unit 202 on the basis of the operating state of the second gate acquired by the operating state acquisition unit 203. The threshold change unit 204 may have a configuration similar to that of the threshold change unit 136 of FIG. 4, but it is not limited thereto.

The face authentication apparatus 200 according to the example embodiment configured as described above operates as described below. First, the face image acquisition unit 201 acquires a face image of a user who passes through the first gate provided at the first boundary between zones. Then, the collation unit 202 performs face authentication on the face image acquired by the face image acquisition unit 201 on the basis of a threshold. Then, the operating state acquisition unit 203 acquires an operating state of the second gate provided at the second boundary that is different from the first boundary. Then, the threshold change unit 204 changes the threshold for collation to be used by the collation unit 202 on the basis of the operating state of the second gate acquired by the operating state acquisition unit 203.

As described above, according to the example embodiment, a collation threshold to be used for face authentication at the first gate provided at the first boundary between zones is automatically changed according to the operating state of the second gate provided at the second boundary that is different from the first boundary. Therefore, systematic security gates can be constructed by linking a plurality of gates.

While the example embodiments has been described with reference to the exemplary embodiments described above, the example embodiments is not limited to the above-described embodiments. The form and details of the example embodiments can be changed within the scope of the example embodiments in various manners that can be understood by those skilled in the art.

For example, in the first exemplary embodiment, when authentication of a specific person (important person) succeeded at the gate G1 or G2 and the specific person entered the first zone from the outside, the threshold of such gate G1 or G2 may be increased, or the authentication method may be changed from one-factor authentication using face authentication to two-factor authentication using face authentication and IC card authentication or the like so as to enhance the security level. Meanwhile, it causes a problem if there is a case where a specific person who entered the first zone cannot enter the second zone. Therefore, the threshold of the gates G3 and G4 may be lowered to improve convenience. Further, it is assumed that a third zone is a server room for example, and the gate G5 is electrically closed generally in order to prevent entering of an unauthorized person. In that case, when an authorized person entered the second zone via the gate G3 or G4, the closed state of the gate G5 may be electrically released so as to allow face authentication at the gate G5 to be accepted. Besides them, various types of rules for controlling thresholds of gates can be considered.

Furthermore, in the first exemplary embodiment, the example embodiment is applied to the case where higher security is desired for a zone located more internally. On the contrary, the example embodiments is also applicable to the case where higher convenience is desired for a zone located more internally.

The example embodiments is applicable to an access monitoring system, an attendance management system, and the like, and in particular, suitable for the case of improving convenience and security by automatically correct the threshold used for collation appropriately without placing a burden on the users.

The whole or part of the exemplary embodiments disclosed above can be described as, but not limited to, the following supplementary notes.

(Supplementary Note 1)

A face authentication apparatus comprising:

a face image acquisition unit that acquires a face image of a user who passes through a first gate provided at a first boundary between a plurality of zones;

a collation unit that performs face authentication on the face image on a basis of a threshold;

an operating state acquisition unit that acquires an operating state of a second gate provided at a second boundary that is different from the first boundary; and a threshold change unit that changes the threshold on a basis of the operating state.

(Supplementary Note 2)

The face authentication apparatus according to supplementary note 1, wherein, the plurality of the zones have a plurality of security levels.

(Supplementary Note 3)

The face authentication apparatus according to supplementary note 1 or 2, wherein the operating state acquisition unit acquires whether or not the second gate is released to allow free passage, as one of the operating states of the second gate.

(Supplementary Note 4)

The face authentication apparatus according to any of supplementary notes 1 to 3, wherein the operating state acquisition unit acquires whether or not the second gate is closed to prevent passage, as one of the operating states of the second gate.

(Supplementary Note 5)

The face authentication apparatus according to any of supplementary notes 1 to 4, wherein the operating state acquisition unit acquires whether or not personal authentication performed at the second gate is multi-factor authentication, as one of the operating states of the second gate.

(Supplementary Note 6)

The face authentication apparatus according to any of supplementary notes 1 to 5, wherein the operating state acquisition unit acquires whether or not personal authentication performed at the second gate is one-factor authentication, as one of the operating states of the first gate.

(Supplementary Note 7)

The face authentication apparatus according to any of supplementary notes 1 to 6, wherein the operating state acquisition unit acquires whether or not personal authentication performed on a specific person at the second gate succeeded, as the operating state of the second gate.

(Supplementary Note 8)

The face authentication apparatus according to any of supplementary notes 1 to 7, wherein the operating state acquisition unit acquires a number of times of authentication success at the second gate in a certain period, as the operating state of the second gate.

(Supplementary Note 9)

The face authentication apparatus according to any of supplementary notes 1 to 8, wherein the first gate and the second gate are gates for entry and exit with respect to zones different from each other in facilities partitioned into the plurality of zones corresponding to a plurality of security levels.

(Supplementary Note 10)

The face authentication apparatus according to any of supplementary notes 1 to 8, wherein the first gate and the second gate are gates for entry and exit with respect to a same zone in facilities partitioned into the plurality of zones corresponding to a plurality of security levels.

(Supplementary Note 11)

The face authentication apparatus according to any of supplementary notes 1 to 10, wherein the threshold change unit changes the threshold on a basis of the operating state and a collation threshold changing rule set in advance.

(Supplementary Note 12)

The face authentication apparatus according to any of supplementary notes 1 to 11, wherein the plurality of the zones include a first zone and a second zone that is allowed to be entered only from the first zone, and the first gate is provided at an entrance to the second zone from the first zone.

(Supplementary Note 13)

The face authentication apparatus according to any of supplementary notes 1 to 11, wherein the plurality of the zones include a first zone and a second zone that is allowed to be entered only from the first zone, and the first gate is provided at an entrance to the second zone from the first zone, and the collation unit performs the face authentication by detecting a visitor of the first zone on a basis of personal authentication result of a gate provided at an entrance to the first zone among the plurality of the gates, selecting a reference face image of the visitor from reference face images of respective registered users, calculating similarity between the face image and the reference face image selected, and comparing the similarity with a threshold.

(Supplementary Note 14)

The face authentication apparatus according to any of supplementary notes 1 to 13, wherein in the face authentication, similarly between the face image and the reference face image is calculated by collating a feature amount of a face extracted from the face image with a feature amount of a face extracted from a reference face image of each registered user.

(Supplementary Note 15)

A face authentication method comprising:

acquiring a face image of a user who passes through a first gate provided at a first boundary between a plurality of zones;

performing face authentication on the face image on a basis of a threshold;

acquiring an operating state of a second gate provided at a second boundary that is different from the first boundary; and changing the threshold on a basis of the operating state.

(Supplementary Note 16)

The face authentication method according to supplementary note 15, wherein the plurality of the zones have a plurality of security levels.

(Supplementary Note 17)

The face authentication method according to supplementary note 15 or 16, wherein the acquiring the operating state includes acquiring whether or not the second gate is released to allow free passage, as one of the operating states of the second gate.

(Supplementary Note 18)

The face authentication method according to any of supplementary notes 15 to 17, wherein the acquiring the operating state includes acquiring whether or not the second gate is closed to prevent passage, as one of the operating states of the second gate.

(Supplementary Note 19)

The face authentication method according to any of supplementary notes 15 to 18, wherein the acquiring the operating state includes acquiring whether or not personal authentication performed at the second gate is multi-factor authentication, as one of the operating states of the second gate.

(Supplementary Note 20)

The face authentication method according to any of supplementary notes 15 to 19, wherein the acquiring the operating state includes acquiring whether or not personal authentication performed at the second gate is one-factor authentication, as one of the operating states of the first gate.

(Supplementary Note 21)

The face authentication method according to any of supplementary notes 15 to 20, wherein the acquiring the operating state includes acquiring whether or not personal authentication performed on a specific person at the second gate succeeded, as the operating state of the second gate.

(Supplementary Note 22)

The face authentication method according to any of supplementary notes 15 to 21, wherein the acquiring the operating state includes acquiring a number of times of authentication success at the second gate in a certain period, as the operating state of the second gate.

(Supplementary Note 23)

The face authentication method according to any of supplementary notes 15 to 22, wherein the first gate and the second gate are gates for entry and exit with respect to zones different from each other in facilities partitioned into the plurality of zones corresponding to a plurality of security levels.

(Supplementary Note 24)

The face authentication method according to any of supplementary notes 15 to 22, wherein the first gate and the second gate are gates for entry and exit with respect to a same zone in facilities partitioned into the plurality of zones corresponding to a plurality of security levels.

(Supplementary Note 25)

The face authentication method according to any of supplementary notes 12 to 24, wherein the changing the threshold includes changing the threshold on a basis of the operating state and a collation threshold changing rule set in advance.

(Supplementary Note 26)

The face authentication method according to any of supplementary notes 15 to 25, wherein the plurality of the zones include a first zone and a second zone that is allowed to be entered only from the first zone, and the first gate is provided at an entrance to the second zone from the first zone.

(Supplementary Note 27)

The face authentication method according to any of supplementary notes 15 to 25, wherein the plurality of the zones include a first zone and a second zone that is allowed to be entered only from the first zone, and the first gate is provided at an entrance to the second zone from the first zone, and the performing the face authentication includes performing the face authentication by detecting a visitor of the first zone on a basis of personal authentication result of a gate provided at an entrance to the first zone among the plurality of the gates, selecting a reference face image of the visitor from reference face images of respective registered users, calculating similarity between the face image and the reference face image selected, and comparing the similarity with a threshold.

(Supplementary Note 28)

The face authentication method according to any of supplementary notes 15 to 27, wherein the performing the face authentication includes calculating similarly between the face image and the reference face image by collating a feature amount of a face extracted from the face image with a feature amount of a face extracted from a reference face image of each registered user.

(Supplementary Note 29)

A computer-readable medium storing a program for causing a computer to function as:

a face image acquisition unit that acquires a face image of a user who passes through a first gate provided at a first boundary between a plurality of zones;

a collation unit that performs face authentication on the face image on a basis of a threshold;

an operating state acquisition unit that acquires an operating state of a second gate provided at a second boundary that is different from the first boundary; and a threshold change unit that changes the threshold on a basis of the operating state.

REFERENCE SIGNS LIST

ST site
BU building
IR important room
G1-G10 gate
100 face authentication apparatus
111 interface
112 interface
113 communication interface
114 operation input unit
115 screen display unit
120 storage unit
121 program
122 reference face image data
123 collation threshold
124 gate operating state data
125 collation threshold changing rule
130 arithmetic processing unit
131 input unit
132 face image acquisition unit
133 collation unit
134 output unit
135 operating state detection unit
136 threshold change unit
141 user
142 camera unit
200 face authentication apparatus
201 face image acquisition unit
202 collation unit
203 operating state acquisition unit
204 threshold change unit

The invention claimed is:

1. A face authentication apparatus comprising:
a memory containing program instructions; and
a processor coupled to the memory, wherein the processor is configured to execute the program instructions to:
acquire a face image of a user who passes through a first gate provided at a first boundary that separates adjacent zones;
perform face authentication on the face image on a basis of a threshold;
acquire whether or not a second gate, provided at the first boundary, is closed to prevent passage, as an operating state of the second gate; and
change the threshold on a basis of the operating state.

2. The face authentication apparatus according to claim 1, wherein
each of the first gate and the second gate is one of a plurality of gates that must be passed through for moving from a first zone to a second zone.

3. The face authentication apparatus according to claim 1, wherein
the changing the threshold includes changing the threshold to a value smaller than an initial value.

4. A face authentication method comprising:
acquiring a face image of a user who passes through a first gate provided at a first boundary that separates adjacent zones;
performing face authentication on the face image on a basis of a threshold;
acquiring whether or not a second gate, provided at the first boundary, is closed to prevent passage, as an operating state of the second gate; and
changing the threshold on a basis of the operating state.

5. The face authentication method according to claim 4, wherein
each of the first gate and the second gate is one of a plurality of gates that must be passed through for moving from a first zone to a second zone.

6. The face authentication method according to claim 4, wherein
the changing the threshold includes changing the threshold to a value smaller than an initial value.

7. A non-transitory computer-readable medium storing a program comprising instructions for causing a computer to perform processing to:
acquire a face image of a user who passes through a first gate provided at a first boundary that separates adjacent zones;
perform face authentication on the face image on a basis of a threshold;
acquire whether or not a second gate, provided at the first boundary, is closed to prevent passage, as an operating state of the second gate; and
change the threshold on a basis of the operating state.

8. The non-transitory computer-readable medium according to claim 7, wherein
each of the first gate and the second gate is one of a plurality of gates that must be passed through for moving from a first zone to a second zone.

9. The non-transitory computer-readable medium according to claim 7, wherein the changing the threshold includes changing the threshold to a value smaller than an initial value.

* * * * *